July 10, 1956     G. H. MUSSELMAN     2,754,511
SIGNAL PULSE AMPLITUDE EQUALIZER Filed Nov 29, 1945     2 Sheets-Sheet 1

INVENTOR
GLENN H. MUSSELMAN

BY

ATTORNEY

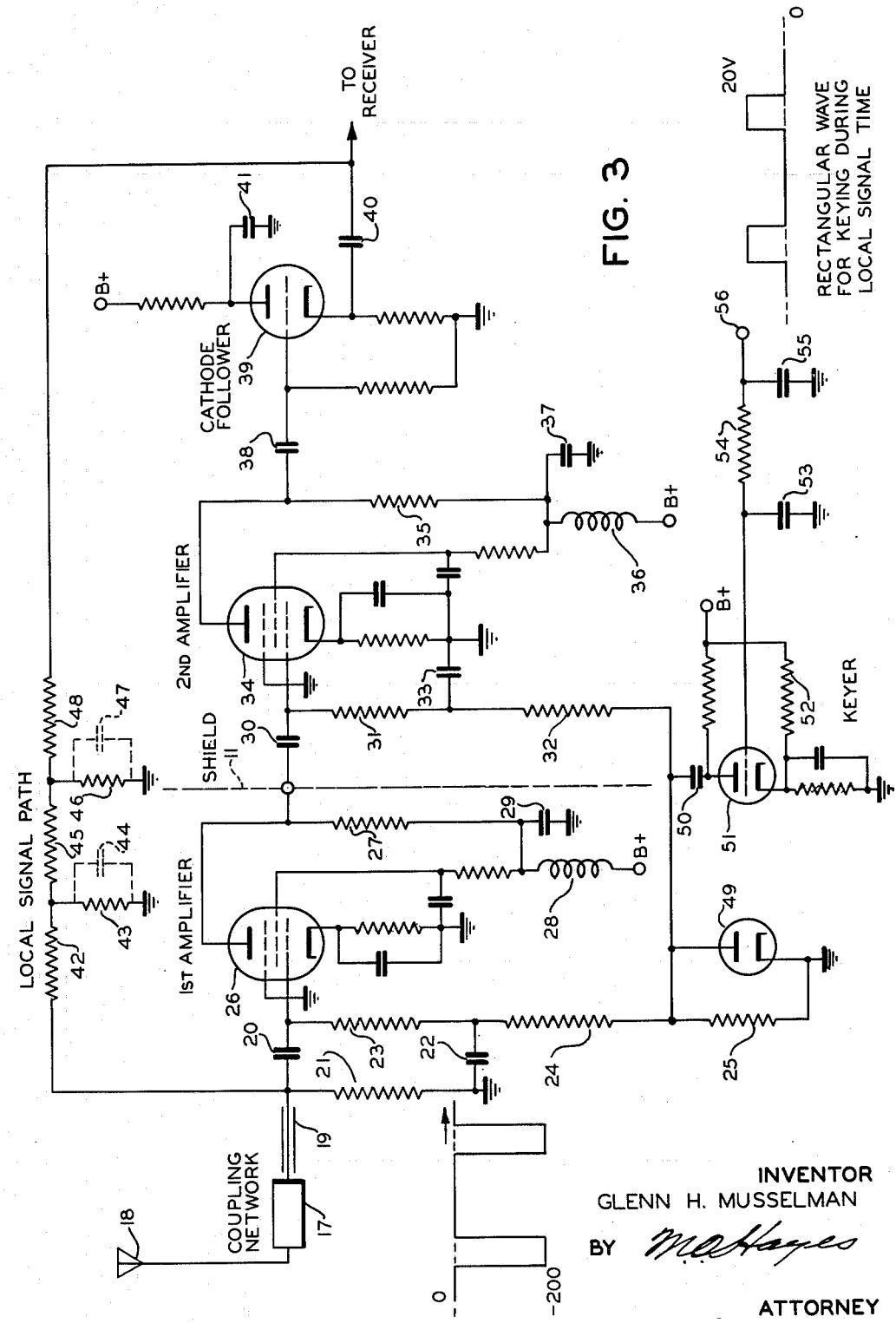

United States Patent Office 2,754,511
Patented July 10, 1956

2,754,511

SIGNAL PULSE AMPLITUDE EQUALIZER

Glenn H. Musselman, Boston, Mass., assignor, by mesne assignments, to the United States of America as represented by the Secretary of the Navy Application November 29, 1945, Serial No. 631,743

11 Claims. (Cl. 343—103)

This invention relates to an electronic attenuator system, and more particularly to such a system for equalizing the amplitudes of pulse signals which are to be matched for purposes of measuring their time differential.

This invention, in the particular case herein illustrated, is employed in navigation systems of the type described in the patent application of A. L. Loomis filed July 3, 1945, Serial No. 603,090 and entitled "Long Range Navigation System" and the patent application of Jabez C. Street, John A. Pierce and Donald E. Kerr entitled "Long Range Navigation System" filed June 13, 1945, Serial No. 599,163, now Patent 2,689,346 issued September 14, 1954. In this system of navigation one of the characteristic features of ground station operation is the matching by the presentation on a suitable cathode ray device of the pulse signals from a local ground station and a remote ground station spaced at known positions several hundred miles from each other for the purpose of controlling the precise time differential between the pulse signals. This is facilitated by attenuating the strong pulse signal from the local ground station so as to approximate in amplitude the weak pulse signal received from the remote ground station. Such a balance makes it possible to measure the time differential between the two pulse signals to a very fine degree. As an example, the time spacing between two pulse signals rising symmetrically in fifty microseconds can easily be determined to within one microsecond when the amplitudes have been equalized and when one pulse signal is superimposed on the other pulse signal.

Originally, an electro-mechanical system was used. This system consisted of relays which were actuated electronically by the timer controlling the transmitted pulse signal of the local station and which short circuited the receiving antenna and disconnected the receiver from the antenna during the local transmission. However, serious maintenance problems resulted from using the mechanical system.

The primary object of this invention is to overcome the foregoing difficulties, and to provide electronic means for the intended purpose.

A further object of this invention is to provide a means for amplifying one pulse signal to a desired magnitude, and to attenuate another pulse signal to a desired magnitude, and more specifically to equalize their magnitudes, even though their initial difference in magnitude may be very large, say of the ratio of a million to one.

This invention will be described in detail by referring to the accompanying drawings, in which:

Fig. 3 is a wiring diagram explanatory of the invention.

Figure 1:
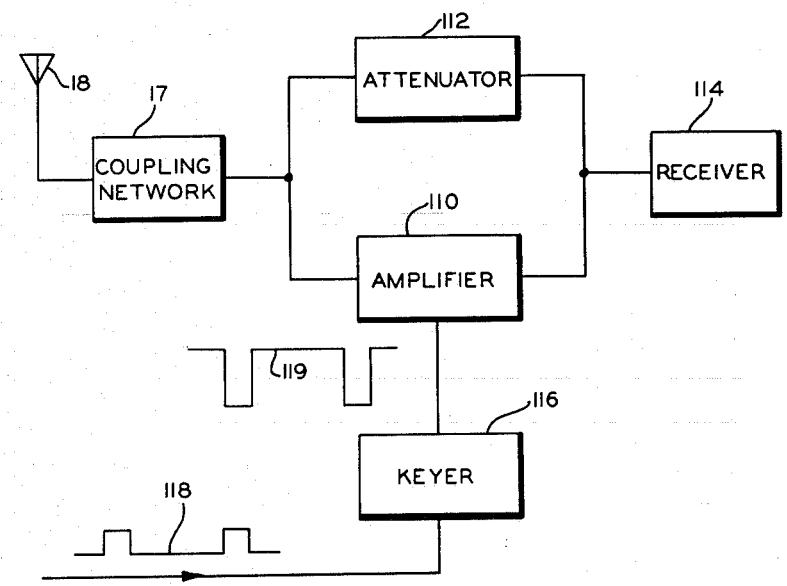
Fig. 1 is a block diagram explanatory of the invention.

Referring to the drawing and more particularly to Fig. 1, the invention comprises a receiver antenna 18 connected to a coupling network 17 and to an amplifier 110 for passing a pulse signal. Amplifier 110 is arranged in parallel with an attenuator 112 for very greatly attenuating a pulse signal. The amplifier 110 and the attenuator 112 are connected in common to a receiver 114.

Antenna 18 receives strong pulse signals and weak pulse signals both having the same repetition rate, but displaced in time. It is desired that receiver 114 compare the time of occurrence of the pulses, and to facilitate this, the strong and the weak pulses are preferably equalized before being fed to the receiver. This is done by cutting off the amplifier 110 during the strong pulse signal, so that that pulse signal is weakened in attenuator 112. The amplifier is conductive only during receipt of the weak pulse signals. To cut off the amplifier, the grids of the amplifier tubes may be biased negatively by means of pulses 119 from a keyer 116 which is itself controlled by pulses 118 coincidental with the strong pulse signals.

Figure 2:
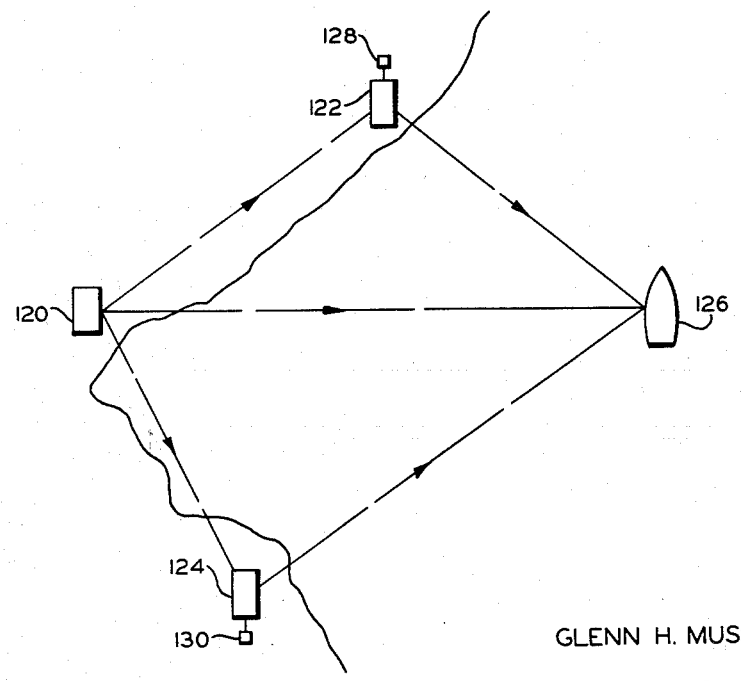
Fig. 2 represents schematically a navigation system in which the invention may be used.

The particular use of the invention here disclosed may be explained with reference to Fig. 2. This shows a long range navigation system using two pairs of fixed stations and a shipborne receiver. One pair consists of the fixed stations indicated at 120 and 122. The other pair consists of the fixed stations 120 and 124. A ship is indicated at 126, but the invention is also applicable to aircraft. The stations 120, 122 and 124 send out pulse signals, and it is important that the timing of the pulse signals sent from one station of a pair of stations, for example station 122, be accurately controlled with reference to the other or master station 120. For this purpose, station 122 has associated with it a receiver 128, and similarly station 124 has associated with it a receiver 130. The receiver 128 receives both strong pulse signals from the local transmitter 122 and weak pulse signals from the remote master station 120. The receiver 130 receives strong pulse signals from the local transmitter 124 and weak pulse signals from the remote transmitter 120. The difference in amplitude may be enormous, say of the order of a million to one. The purpose of the present invention is to so greatly attenuate the strong pulse signals, and if desired, to also amplify the weak pulse signals, as to make them approximately equal before sending them to a receiver and indicator for comparison of the time of occurrence.

Referring now to Fig. 3 for a more detailed description of the invention, the amplifier circuit includes two pentode vacuum tubes 26 and 34, connected as broad band amplifiers, and a triode vacuum tube 39 connected as a cathode follower. The two tubes 26 and 34 have small interelectrode capacitance, and low plate load resistors 27 and 35. Coupling throughout this circuit is accomplished conventionally by means of coupling condensers 20, 30, 38 and 40. Resistors 23, 24, 25, 31 and 32, provide direct current paths to ground for the grids of vacuum tubes 26 and 34, and also in combination with condensers 22 and 33 provide filtering or by-pass circuits for stray unwanted radio frequencies. These filtering elements together with the inter-stage shielding 11 result in low leakage between input and output terminals of this circuit during the time that the vacuum tubes 26 and 34 are inoperative. Choke coils 28 and 36 and by-pass condensers 29, 37 and 41 are introduced into this circuit to eliminate any R. F. coupling between stages via the B+ power supply path. Resistance 21 connected between the grid of tube 26 and ground is used to match the impedance of a transmission line 19 which connects a coupling network 17 to the whole attenuator system.

Connected in parallel with the last mentioned amplifier circuit is an attenuator circuit comprised of resistors 42, 45 and 48 connected in series and resistors 43 and 46 connected in parallel. The resistor 43 is connected from a point between resistors 42 and 45 to ground, and resistor 46 is connected from a point between resistors 45 and 48 and ground. Capacitors 44 and 47 represent distributed capacitance of resistors 43 and 46, respectively.

The third or keyer circuit whose output is connected to and thus controls the grids of tubes 26 and 34 consists of a resistance-capacitance filter network, an amplifier and phase inverter triode vacuum tube 51, and a voltage stabilizer vacuum diode 49. The resistance-capacitance network, which is made up of condensers 53 and 55 and resistor 54, is used to by-pass stray radio frequencies that possibly would feed back into the independent master timing circuits. Its output is connected to the grid of tube 51 whose output, in turn, is coupled to the plate of tube 49 by means of coupling condenser 50. Resistor 52, connected from the cathode of tube 51 in series with the B+ power supply, is to provide proper cathode bias to this tube 51.

In operation, pulse signals of the same frequency and recurrence rate but received at different times from the pair of navigation ground stations are received at antenna 18 and are fed to the grid of tube 26. The two control grids of tubes 26 and 34 are biased way below the cut-off value during the reception of strong local pulse signal, but are maintained at ground potential during the reception of a weak remote pulse signal. This bias is accomplished by using a rectangular wave originating at the master timer circuits of the local ground station controlling the local transmitted pulse signal. The original rectangular wave from the master timer consists of positive pulses of approximately 20 volts amplitude above ground. These positive pulses are coincidental with the transmitted pulses of the local station and are applied by wire communication to the control grid of tube 51 through the resistance-capacitance filter where they are inverted, amplified approximately 10 times, and are then applied to the plate of tube 49 through coupling condenser 50. Tube 51 is normally cut off between the positive pulses due to the selected cathode bias obtained from the dropping resistor 52 connected in series with the B+ power supply. The rectangular wave appearing on the plate of tube 49 and hence applied to the grids of tubes 26 and 34 through their respective grid resistors consists now of negative pulses of approximately −200 volts. This rectangular wave is, however, maintained at ground potential between negative pulses by means of the diode tube 49 whose cathode is tied directly to ground.

During the reception of a remote pulse signal, the two stage amplifier has a gain of about 2, but during the time that tubes 26 and 34 are cut off, the attenuation is about 500,000 to 1, giving a ratio between the two pulse signals of about 1,000,000 to 1. This large ratio is necessitated by the fact that the local station is close by while the remote station may be 600 miles way. Sufficient local signal may, however, be by-passed around the two-stage amplifier through the resistance network, already described, to give a pulse signal of the desired amplitude. If more gain is desired for the unbiased condition of the two-stage amplifier, it can be introduced without materially increasing the leakage path between stages.

A final and important consideration of this attenuator system is the elimination of any serious time differential between the two pulse signals within the circuit. By the use of the two stage broad-band amplifier, having no resonant circuits, the time delay through this part of the circuit in the unbiased condition is less than one microsecond. This can be compensated for by means of the resistance network used as the by-passing path for a local pulse signal.

It is believed that the construction and operation of this electronic attenuator, as well as the advantages thereof, will be apparent from the foregoing description thereof. It will also be apparent that while the invention has been shown and described in a preferred form, changes may be made without departing from the invention, as sought to be defined in the following claims.

What is claimed is:

1. A system to equalize strong and weak pulse signals having the same repetition rate but occurring at different times, said system comprising an attenuator to greatly reduce the strong pulse signals, a vacuum tube circuit arranged is parallel with said attenuator to pass the weak pulse signals, and means to cut off said vacuum tube circuit at the time of the strong pulse signals.

2. A system to equalize strong and weak pulse signals having the same repetition rate but occurring at different times, said system comprising a resistance network arranged to act as an attenuator to greatly reduce the strong pulse signals, a vacuum tube amplifier circuit arranged in parallel with said attenuator to amplify the weak pulse signals, and means provided to cut off said vacuum tube amplifier circuit at the time of the strong pulse signals.

3. A system to equalize strong and weak pulse signals having the same repetition rate but occurring at different times, said system comprising a resistance network arranged to act as an attenuator to greatly reduce the strong pulse signals, a vacuum tube amplifier circuit arranged in parallel with said attenuator to amplify the weak pulse signals, and means to cut off said vacuum tube amplifier at the time of the strong signals, said means including an amplifier responsive to pulse signals coincidental with the strong pulse signals for generating a strong negative rectangular wave which is applied to the aforesaid vacuum tube amplifier circuit in order to cut off the same.

4. In a navigation system employing a local and a remote fixed station for transmitting pulse signals having the same repetition rate but differing in time of occurrence, said local fixed station comprising a transmitter, a monitoring receiver for comparing the time of occurrence of the locally transmitted pulses with those transmitted by the remote fixed station, and means for approximately equalizing the amplitudes of the strong local pulses and the weak remote pulses, said means including an attenuator to greatly reduce the strong pulse signals, a vacuum tube circuit arranged in parallel with said attenuator, and a wire connection from the local transmitter to the receiver for providing voltage pulses coincidental with the strong local pulse signals to bias the aforesaid vacuum tube to cut off at the time of local transmission of pulse signals.

5. A navigation system employing a local and a remote fixed station for transmitting pulse signals having the same repetition rate but differing in time of occurrence, said local fixed station comprising a transmitter, a monitoring receiver for comparing the time of occurrence of the locally transmitted pulses with those transmitted by the remote fixed station, and means for approximately equalizing the amplitudes of the strong local pulses and the weak remote pulses, said means including a resistance network arranged to act as an attenuator to greatly reduce the strong pulse signals, a vacuum tube amplifier circuit arranged in parallel with said attenuator to amplify the weak pulse signals, a wire connection from the local transmitter to the receiver for providing pulses coincidental with the strong pulse signals, an amplifier for generating therefrom a strong negative voltage pulse, and means for applying said voltage pulse as a bias to the aforesaid vacuum tube amplifier circuit in order to cut off the same at the time of the strong pulse signals.

6. A circuit for balancing the amplitudes of strong local pulse signals and weak remote pulse signals applied to a pulse receiver from an antenna comprising, a broad band pulse amplifier coupling said signal pulses to said receiver, means to bias said amplifier to non-conduction at the time of occurrence of said local pulse signal, and an attenuator shunting said amplifier to apply attenuated local pulse signals to said receiver.

7. A circuit for balancing the amplitudes of strong local pulse signals and weak remote pulse signals applied to a pulse receiver from an antenna comprising, a broad band amplifier coupling said weak remote signals to said receiver, a resistance network shunting said amplifier to apply to said receiver said strong local signals attenuated by a predetermined amount, and means to bias said amplifier to nonconduction during the reception of said strong local signals.

8. A circuit for balancing the amplitudes of strong local pulse signals and weak remote pulse signals applied to a local pulse receiver comprising, a source of timing pulses controlling the time of transmission of said local pulse signals, a broad band amplifier for coupling said weak signals to said receiver, a resistance network shunting said amplifier to apply to said receiver said strong signals attenuated in amplitude by predetermined amount and means responsive to pulses from said source to bias said amplifier to cut off during the transmission of local signals.

9. A system to equalize the amplitude of strong and weak pulse signals comprising, a receiver for said signals, means for reducing the amplitude of said strong signals a predetermined amount, means for amplifying the amplitude of said weak signals a predetermined amount, means separately coupling said attenuated signals and said amplified signals to said receiver, and means biasing said amplifying means to nonconduction for the time duration of said strong signals, whereby said strong signals and said weak signals are applied to said receiver with substantially equal amplitudes.

10. A system to equalize the amplitudes of strong and weak pulse signals comprising a receiver for said signals, an attenuator for reducing the amplitude of said strong signals to a predetermined level, an amplifier for increasing the amplitude of said weak signals a predetermined amount, means coupling said attenuated signals and said amplified signals to said receiver, and means for biasing said amplifier to cut off during the time of transmission of said strong signals.

11. A system to equalize the amplitudes of strong local and weak remote pulse signals comprising, a receiver for said signals, an attenuator for reducing the amplitude of said strong signals to a predetermined level, an amplifier for increasing the amplitude of said weak signals a predetermined amount, means coupling the output of said attenuator and the output of said amplifier to said receiver, a source of timing pulses controlling the transmission of said local signals, and means responsive to said timing pulses from said source for biasing said amplifier to cut off during the time of transmission of said strong local signals.

References Cited in the file of this patent

UNITED STATES PATENTS

| | | |
|---|---|---|
| 2,055,883 | Terry | Sept. 29, 1936 |
| 2,147,810 | Alford | Feb. 21, 1939 |
| 2,262,838 | Deloraine | Nov. 18, 1941 |
| 2,419,620 | Young | Apr. 29, 1945 |
| 2,421,340 | Levy | May 27, 1947 |
| 2,427,523 | Dolberg et al. | Sept. 16, 1947 |
| 2,429,623 | Hoisington | Oct. 28, 1947 |
| 2,498,381 | Smith | Feb. 21, 1950 |

FOREIGN PATENTS

| | | |
|---|---|---|
| 112,814 | Australia | Mar. 26, 1941 |

OTHER REFERENCES

Ser. No. 429,583, H. De France (A. P. C.), published June 15, 1943.